Nov. 26, 1946.　　　J. S. NIELSEN ET AL　　　2,411,801
METAL BENDING AND STRETCHING APPARATUS
Filed Sept. 11, 1943　　　3 Sheets-Sheet 1
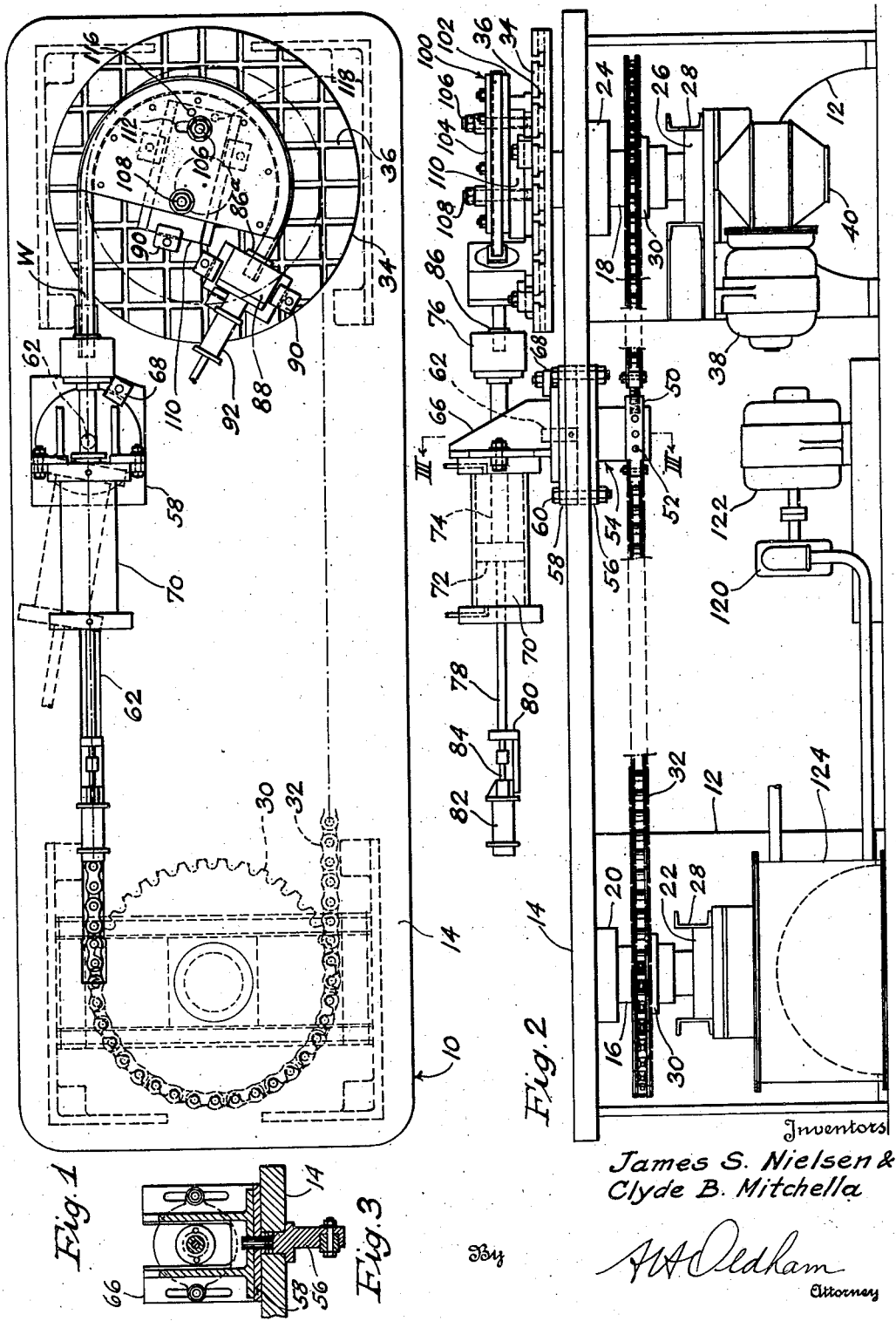
Inventors
James S. Nielsen &
Clyde B. Mitchell
By
A. H. Oldham
Attorney Nov. 26, 1946. J. S. NIELSEN ET AL 2,411,801
METAL BENDING AND STRETCHING APPARATUS
Filed Sept. 11, 1943   3 Sheets-Sheet 2

Inventors
James S. Nielsen &
Clyde B. Mitchell

By A H Oldham
Attorney

Patented Nov. 26, 1946

2,411,801

UNITED STATES PATENT OFFICE 2,411,801

METAL BENDING AND STRETCHING APPARATUS

James S. Nielsen, Stow, and Clyde B. Mitchella, Akron, Ohio, assignors to Goodyear Aircraft Corporation, Akron, Ohio, a corporation of Delaware Application September 11, 1943, Serial No. 501,916

13 Claims. (Cl. 153—40)

1

This invention relates to metal stretching and bending apparatus, and, in particular, to an apparatus for forming straight bar material of metal and the like of any cross sectional configuration into smooth contours of predetermined shape by stretching the stock material and at the same time winding it around a forming die.

Machines are known on which a tube or the like is bent without stretching around a die. However, in this case a male and a female die are required to avoid wrinkling of the material and the rather expensive die does not give satisfactory results without compensating the die for springback of the material.

Other machines are known which apply stretching while bending of the work piece takes place. However, machines of this type, although producing satisfactory work on some sections and sizes, are bulky and heavy in construction, require a large space and considerable personnel, and are not adapted for bending through an angle of more than 180 degrees, but usually operate to through angles of much less than 180 degrees.

The present invention avoids the shortcomings of these known constructions by a novel arrangement whereby the stock material is stretched and at the same time is wound around a form block or die secured to a turntable. The stretching means, usually a hydraulic cylinder, is attached to an endless chain which passes around a sprocket secured to the turntable at one end and an idler sprocket mounted at the opposite end of the work table. As the table rotates, the cylinder moves toward the turntable, at exactly the same lineal speed as the periphery of the sprocket.

Two pneumatically operated jaws are employed to hold the stock, one jaw being fastened to the piston rod of the cylinder and one jaw being secured to the turntable adjacent the form block. The construction of the apparatus is such that a constant or controlled tensile force is exerted on the part during the entire forming operation. Owing to the fact that the distance from form block contour to the center of the turntable may vary, the circumferential speed of the form die usually differs from the speed of the hydraulic cylinder. This difference is compensated for by the movement of the piston in its cylinder, thus always securing the necessary tension in the work piece. The finished article thus formed on this machine has a smooth surface free from wrinkles and conforms perfectly to the shape of the form die with practically no spring back.

The main object of this invention is the provision of apparatus for forming rolled, extruded

2 or sheet metal bars around a revolvable form block without spring back.

Another object of the invention is to provide apparatus for forming metal, or like material, around a form block over an angle of more than about 180 degrees.

Another object of the invention is the provision of compact apparatus of the type described and which is relatively inexpensive to build and to maintain, long wearing and easily operated in use with a minimum of readily trained personnel, and which rapidly and efficiently turns out high grade and uniform work.

Another object of the invention is to provide apparatus of the character described and operable solely with a fluid pressure motor.

Another object of the invention is the provision of a modification of the apparatus wherein the sprocket and chain assembly need not be employed.

Another object of the invention is the provision of a sectional or multi-part die for forming metal substantially without spring back.

Other objects of the invention will appear as the description proceeds.

For a better understanding of the invention reference should be had to the accompanying drawings wherein:

Figure 1 is a top plan view of one embodiment of the invention showing a work piece in the machine after a completed bending operation;

Figure 2 is a front elevation of the apparatus of Figure 1 with the front supports broken away for a better showing of the driving mechanism of the machine;

Figure 3 is a fractional section through the table on line III—III of Figure 2;

Figure 4:
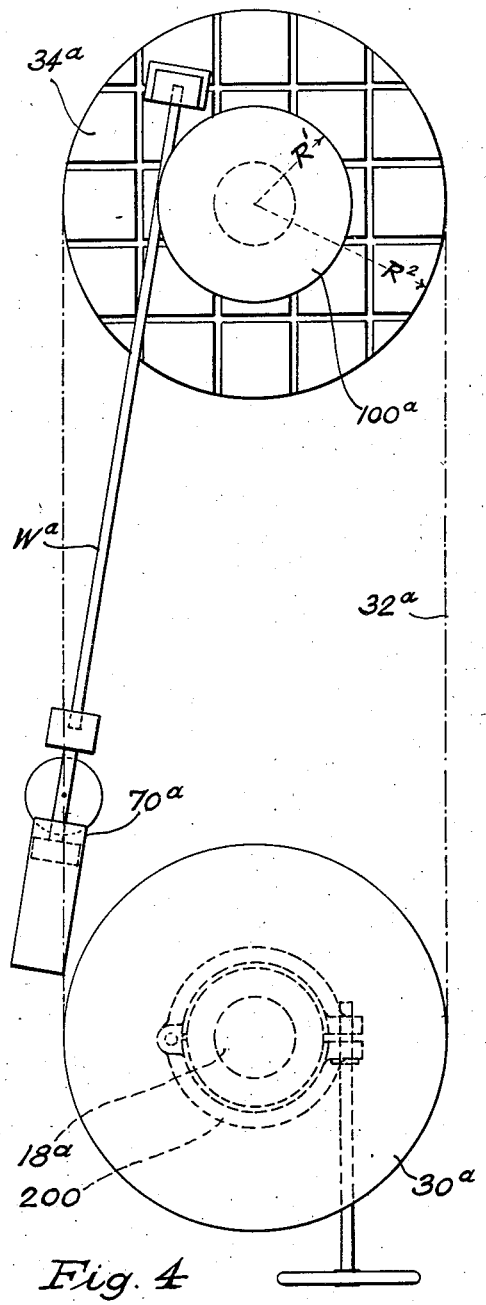
Figure 4 is a diagrammatic plan view illustrating the manner in which the apparatus of Figures 1 to 3 can be operated without a motor.

The apparatus of the invention in one best known embodiment consists of a table, indicated as a whole by the numeral 10, and including supports 12 to which is secured a top 14 at the ends of which are mounted vertical shafts 16 and 18 in bearings 20, 22 and 24, 26, respectively. The bearings 20 and 24 are fastened to the table top and the bearings 24 and 26 to transverse channels 28 connecting the table supports. To each one of the shafts 16 and 18 just beneath the top of the table is keyed a sprocket 30 which sprockets are connected by an endless chain 32. The shaft 18, which extends through and above the top of the table, carries at its upper end a turntable or die support 34 provided with anchor slots 36. The shaft 18 is preferably driven, usually by an electric reversible motor 38 of the variable or multi-speed type, and operates a reduction gear box 40 located underneath the table.

In the chain 32 is inserted a special adjustable link 50 to which is attached, by bolts 52, a slide or cross head 54 consisting of bottom and top parts 56 and 58 connected by bolts 60 and slidable in a slot 62 in the table top 14. In the upper part 58 of the slide is a fixed pivot stud 62 about which is rotatable a support 66. To prevent excessive tipping stress on the stud 62 the support 66 is held against the upper slide part 58 by one or more gib fingers 68.

To the support 66 is bolted in a vertically adjustable manner a hydraulic power cylinder 70 which furnishes the power for stretching the work material W. The cylinder 70 includes a piston 72 having a hollow piston rod 74 which carries at one end a gripping device 76 having movable jaws 86. The side of the piston opposite the rod 74 is provided with a hollow rod extension 78 to the end of which is attached a bracket 80 supporting a small pneumatic cylinder 82 having a piston rod 84 which extends slidably through the hollow bore of the extension 78 and rod 74 to operate the jaws 86 in the gripping device 76.

Another gripping device 88 is adjustably mounted on the turntable 34 by clamps 90. This device also is provided with a small pneumatic cylinder 92 operating jaws 86a by which the end of the work piece W is held while being stretched and bent over a form die 100 mounted on the table.

It will be understood that the work W is stretched between the gripping devices 76 and 88 as it is bent around the form die 100 which is adjustably mounted on the turntable 34. More particularly, the die 100 may take a wide variety of shapes, sizes or constructions, but in the form illustrated it is made of two pieces 102 and 104 bolted together and which in assembled complementary relation form a curved groove into which a portion of the work piece W slidably fits. The forming die 100 is either fixedly or swingably mounted by two bolts 106 and 108 to a block 110 which in turn is fastened to the turntable 34 by clamps 90. The forming die when it is made swingable about the bolt 108 is (as is usually the case when material is to be bent through an arc approaching 180 degrees) provided with an arcuate slot 112 of suitable length through which passes the bolt 106 thereby forming a stop to the arcuate movement of the die in either direction. Provision is also made for fixing the relative position of the die and its supporting block by placing the hole 116 in the die over the hole 118 in the block and by inserting a locking pin therein.

For supplying the hydraulic cylinders with fluid under pressure and to make the apparatus independent of available fluid pressure lines, a pump 120 is ordinarily provided which is driven by an electric motor 122 and with the pump being fed from a service tank 124 to which the fluid, usually oil, returns.

The operation of the machine is very simple and requires only a single operator. To make the machine ready for operation the turntable 34 is rotated to position the gripping devices 76 and 88 in alignment and a distance apart about equal to the length of the work piece. The work piece then is inserted in one pair of jaws and then in the other pair of jaws by moving the piston 72 back or forth, as the case may be, by supplying controlled amounts of fluid thereto from the pump 120. With the forming die and its supporting block locked against relative movement, the turntable is put in motion by operation of the motor 38 and the work piece W is brought under sufficient tension by the controlled flow of fluid to the cylinder 70 to permanently stretch the material the desired amount. The stretching of the work piece prevents wrinkling of the material during the bending process. The pivotal mounting of the power cylinder support results in the stretching force being applied to the work piece in a direction which is always tangent to the circumference of the forming die. The tension on the work piece, and, accordingly, the permanent stretch thereof may be regulated during the bending operation to obtain the best results and a perfectly smooth article without any spring back. In many cases, however, the tension or stretch applied can be kept constant during the bending process.

In cases where the bending angle on the work piece is obtuse or not smaller than 90 degrees and the bending radius not too small the die can remain fixed to its support without resulting in spring back. However, in cases where the turntable is rotated through more than a right angle to bend the work piece to less than a right angle, and particularly when the work piece is bent around a small radius, it is very advantageous to make the die swingable while or after the bending is performed. One manner of achieving the swinging of the die is to position it so that the slot 112 is on the side of the bolt opposite from that shown in Figure 1. The die is then fastened on the block sufficiently tight to permit some slippage so that when the turntable rotates the friction between the work piece and the die will tend to and will turn the die.

Another, and usually a preferred way of operating the pivoted part die, is to complete or substantially complete the bending of the work piece and the rotation of the turntable before removing the locking pin. Thereafter, the locking pin is removed and the work piece is given a final stretch accompanied by a rocking of the pivoted part of the die. The important feature in this operation is that the final and setting stretch thereby imparted to the work piece is not concentrated at one end of the work piece (as is the case where the friction between the die and the work piece of a fixed die prevents the pull on one end of the work piece from being transmitted to the other end thereof), but is applied equally to both ends of the work piece by the rocking of the die.

In the operation of the apparatus it will be understood that as the work piece is bent around the die block the sprocket and chain drive moves the support for the hydraulic cylinder towards the die block whereby only a relatively short hydraulic cylinder is required as distinguished from a long awkward cylinder which might otherwise have been necessary. Further, hydraulic control of the tension and piston movement in the cylinder is facilitated particularly where the die block is positioned on the turntable so as to have about the same radius as the turning sprocket.

It will be noted that with the apparatus of the present invention work pieces can be bent into complex or compound curves and through angles of up to or even greater than 360 degrees. The apparatus requires only the very simplest kind of die block constructions.

Although the drawings are shown with only one turntable as a form die support, the invention contemplates providing a pair of turntables, one on each vertical shaft and a hydraulic cylinder associated with each stretch of the chain 32 extending around the sprockets 30. Thus, a second set of stretching and bending devices is provided opposite the one shown, thereby doubling the productive capacity of the machine without increasing its size.

From the description it will be recognized that the present invention is a decided improvement over previous constructions of stretch-bending machines in that its output is of the highest quality and perfection in smoothness as well as in shape and with spring back substantially eliminated. The articles made by the improved apparatus and by a minimum of ordinary personnel can be produced inexpensively, rapidly, and with little waste of material. Besides, the space required for the improved apparatus is smaller and its cost lower than that of machines for similar purposes.

Turning now to Figure 4 of the drawings, there has been diagrammatically illustrated a modification of the improved apparatus wherein operation is achieved without an electric motor 38 or other means for rotating the turntable. More particularly, it is entirely possible and permissible to employ the hydraulic cylinder 70 of the apparatus to achieve both stretching and bending of the work piece. This result can be accomplished, in the modification of the invention illustrated, inasmuch as the hydraulic cylinder 70a has its piston rod connected to the work piece Wa, as already described, with the work piece extending around a die block 100a. The pulling force on the work piece Wa is transmitted through the cylinder 70a to the chain 32a, as before described with respect to Figures 1 to 3, and thence to the sprocket 30a and the turntable 34a.

Accordingly, the turning moment on the turntable 34a is equal to the stretching tension put into the work piece multiplied by the sprocket radius R2, minus the stretching tension multiplied by the radius R1 from the center of the turntable to the tangent of the die block, minus the moment due to frictional resistance. In other words, as long as the radius of the chain sprocket 30a is somewhat greater than the radius of the die block 100a mounted on the turntable, any force applied to the cylinder 70a to stretch the work piece Wa will also result in a rotation of the turntable to bend or wind the work piece around the form block 100a.

By applying a suitable controllable brake, indicated as a whole by the numeral 200, to the rotation of the turntable 34a, the desired relation between the bending and the stretching of the work piece can be controlled. The brake has been conveniently shown as applied to the shaft 18a mounting one of the sprockets 30a.

Figure 5:
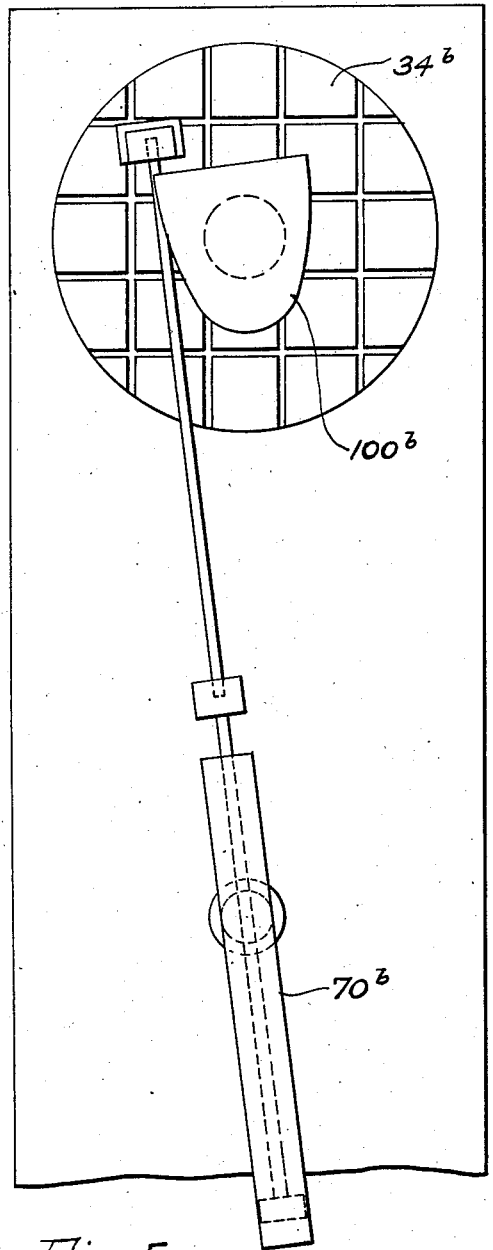
Figure 5 is a diagrammatic plan view of a modification of the apparatus of Figures 1 to 3.

In Figure 5 is illustrated still another embodiment of the invention wherein the sprocket and chain mechanism has been eliminated for moving the hydraulic cylinder towards the die block during the bending operation. This modification is most conveniently employed in conjunction with a particular die block, such as indicated at 100b, which when positioned as shown on turntable 34b can be turned by the turntable to wrap the work piece around it, all without appreciably changing the position of the piston in a fixed hydraulic cylinder 70b but which is free to turn about a vertical pivot.

In this embodiment of the invention the turntable 34b must be rotated by positive turning and bending means, and the entire apparatus may take the form of a separate machine having a somewhat longer hydraulic cylinder to take care of any discrepancies in the windup of the work piece. On the other hand, the apparatus of Figures 1 to 3 may be modified to have a stationary pivot post or hole to which the hydraulic cylinder can be moved for operations upon certain work pieces and die blocks.

Figure 6:
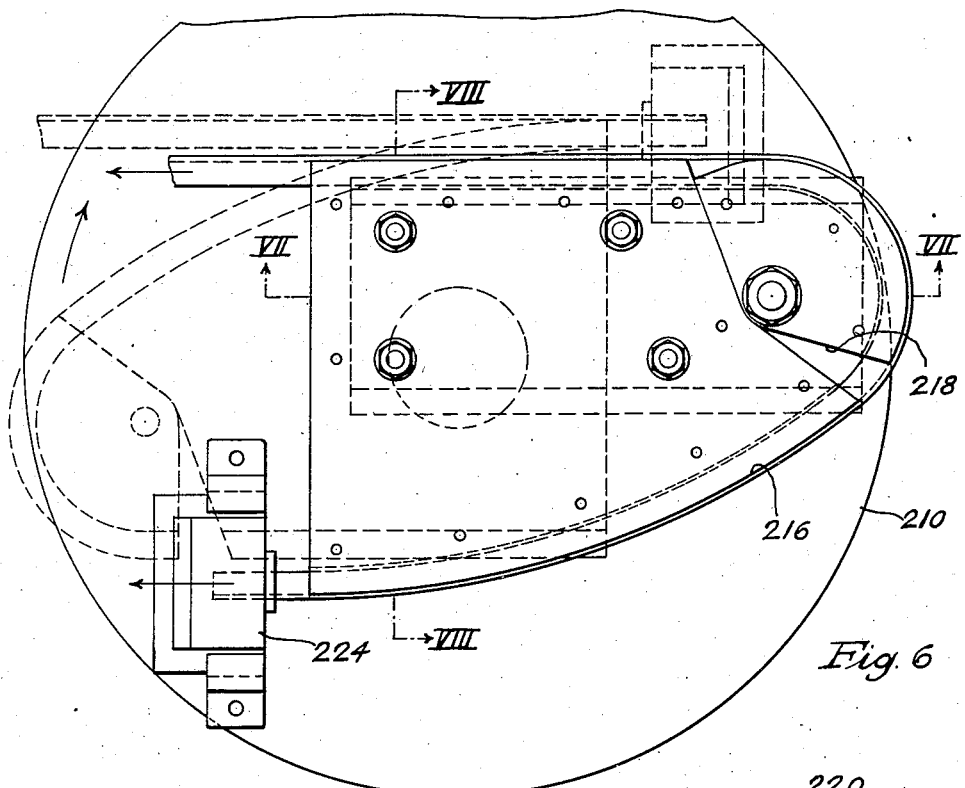
Figure 6 is a plan view of a multi-part forming die.
Figure 7:
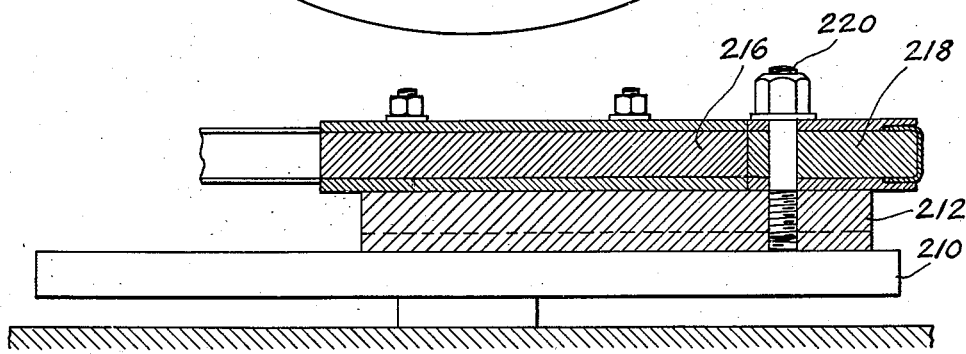
Figure 7 is a sectional view taken one line VII—VII of Figure 6.
Figure 8:
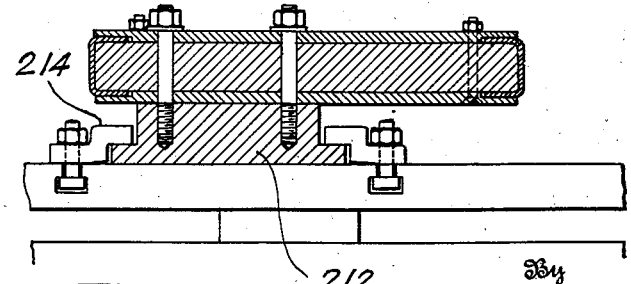
Figure 8 is a sectional view taken on line VIII—VIII of Figure 6.

Figures 6, 7 and 8 show a modification of the die block of the preceding figures of the drawings. More specifically, in the embodiment of the invention of Figures 1 to 3 the entire die block is made movable, whereas Figures 4 and 5 show stationary die blocks. In Figures 6, 7 and 8 part of the die block is rigid and part is movable. It should be understood, of course, that the various die blocks are interchangeable on the several forms of the invention shown, the use of any particular block being dependent upon the particular shape to be formed of the work piece, all as already explained heretofore.

In Figures 6 to 8, the numeral 210 indicates generally a turntable to which is adjustably but fixedly secured by clamps 214 a pillow 212. The pillow has a multipart die block 216, 218 mounted thereon, the part 216 being rigidly fastened to the pillow and the part 218 being pivotally mounted as shown with a stud bolt 220. Each part of the die block in the form shown to produce a curved channel is conveniently made up of relatively thin plates mounted top and bottom of the main die block and with the thin plates being grooved to receive the side flanges of the channel work piece being formed. The turntable 210 is provided with a clamp 224 to receive the end of the work piece.

In the operation of the apparatus, and with the parts in the dotted line position shown, the turntable is rotated in a clockwise direction to move the die block to the solid line position shown. During the associated bending and stretching operation the movable segment 218 of the die may be left free to move or it may be held against movement until near the end of the operation, all as already described in conjunction with the apparatus of Figures 1 to 3. In any event, by employing one or the other of the stretching and bending operations, a wide variety of irregularly or regularly changing radius forms can be made without spring back from Duralumin or other rolled, extruded, or otherwise shaped metal members.

Having now described the invention in detail in reference to the drawings showing but certain examples of construction, it should clearly be understood that the invention is not restricted thereto but many deviations therefrom may be made within the scope and spirit of the appended claims.

What is claimed is:

1. A combined stretching and bending machine for shaping elongated material into contours, comprising a rotatable bending means having the contour to which the material is to be bent, means movable with said bending means for gripping one end of said material, means for rotating said bending means, fluid pressure actuated stretching means adapted to grip said material at a point spaced from said bending means for imparting a stretch to the material as it is bent around the bending means, means mounting the stretching means for movement to and from the bending means, and means controlled by the rotating bending means for controlling the to and from position of the stretching means.

2. A combined stretching and bending machine for shaping bar material into contours, comprising two shafts positioned in parallel relation a suitable distance apart, a sprocket on each shaft, a chain actively engaging said sprockets and having two longitudinal portions moving in opposite directions, die block means carried for rotation by one of said shafts, stretching means attached to said chain and being in cooperative relation to said die block means, and a reversible power unit in driving connection with one of said shafts.

3. A combined stretching and bending machine for shaping bar material into contours, comprising a shaft, endless flexible means engaging said shaft and having two longitudinal portions moving in opposite directions upon rotation of the shaft, a form block mounted to rotate with said shaft, a pivoted support fastened to said flexible means, stretching means including a hydraulically operated cylinder adjustably mounted to said pivoted support and being cooperative with said form block, and a power unit in driving connection with said shaft.

4. A combined stretching and bending machine for shaping elongated material into contours, comprising a table, a vertical shaft passing through and being journaled adjacent one end of said table, bending means fixed to said shaft, a second vertical shaft journaled at the other end of said table, a sprocket mounted on each one of said shafts, an endless chain engaging said sprockets, a stretching means attached to said chain and cooperating with said bending means, and a reversible power unit in driving connection with one of said shafts.

5. A combined stretching and bending machine for shaping elongated material into contours, comprising a table, a vertical shaft passing through and being journaled adjacent one end of said table, a forming die fixed to said shaft, a second vertical shaft journaled at the other end of said table, a sprocket mounted on each one of said shafts below the table, an endless chain engaging said sprockets, a block attached to said chain and being guided in a slot cut into and along one side of the table above said chain, a fluid pressure motor connected by a vertical pivot to the block, and material gripping means carried in association with the die and with the fluid pressure motor, said fluid pressure motor being adapted to stretch said material as it is wrapped around said forming die.

6. A combined stretching and bending machine for shaping bar stock into contours comprising a turntable, means for rotating the table, a bar stock stretching device, means operatively connecting the stretching device to move it in the same direction as the turntable, a gripping device disposed on the turntable and adapted to holding one end of the bar stock, a second gripping device attached to the stretching device and serving to hold the other end of said bar stock, and a forming die pivotally mounted on said turntable and being swingable at least in part about a fixed point thereon in a direction opposite to the direction in which the turntable rotates during a bending operation.

7. A combined stretching and bending machine for shaping elongated material into contours comprising a rotatable forming die table, means for rotating the table, an endless power chain drive associated with said table and having portions of the chain moving parallel but in opposite direction, and a hydraulic stretching cylinder in fixed relation longitudinally of the chain and pivotally secured thereto.

8. A combined stretching and bending machine for bending elongated members into predetermined shapes, comprising a turntable, a bending die, means for mounting the die on the turntable, means adapted to anchor the front end of one of said members on the turntable, means for rotating the turntable to wrap said member around the die while the rear end of said member is thereby drawn forward toward the die, fluid pressure actuated means adapted to be connected to the rear end of said member for exerting thereon sufficient resistance to said forward movement to stretch said member beyond its elastic limit, and means driven from said turntable-rotating means for moving said fluid actuated means forward toward the die at a predetermined rate.

9. A combined stretching and bending machine for bending elongated members into predetermined shapes, comprising a bending die, means adapted to anchor the front end of one of said members adjacent the die, an endless chain for rotating the die to wrap said member around it while the rear end of said member is thereby drawn forward toward the die, and fluid pressure actuated means mounted on said chain and adapted to be connected to the rear end of said member for exerting thereon sufficient resistance to said forward movement to stretch said member beyond its elastic limit.

10. A combined stretching and bending machine for bending elongated members into predetermined shapes, comprising a bending die, means adapted to anchor the front end of one of said members adjacent the die, means for rotating the die to wrap said member around it while the rear end of said member is thereby drawn forward toward the die, a piston adapted to be connected to the rear end of said member, a hydraulic cylinder housing said piston and mounted in spaced relation to the die, and means for supplying hydraulic pressure to said cylinder in front of the piston whereby to resist forward movement of the piston sufficiently to stretch said member beyond its elastic limit.

11. A combined stretching and bending machine for bending elongated members into predetermined shapes, comprising a table, a turntable rotatably mounted thereon, a bending die, means for detachably mounting the die on the turntable, means adapted to anchor the front end of one of said members in any desired position on the turntable, means for rotating the turntable to wrap said member around the die while the rear end of said member is thereby drawn forward toward the die, a piston adapted to be connected to the rear end of said member, a hydraulic cylinder housing said piston, and means pivotally mounting the cylinder on said table on an axis parallel to and a fixed distance from the axis of the turntable, said cylinder being adapted to receive hydraulic pressure in front of the piston whereby to resist forward movement of the piston in the cylinder sufficiently to stretch said member beyond its elastic limit.

12. In a stretching and bending machine for shaping bar stock into contours, a turntable, means for connecting one end of said stock to the table, means for rotating the table, a stretching device adapted to be connected to the opposite end of said stock for holding and stretching it, and a forming die mounted on said turntable for bending said stock as the table rotates and being adapted to swing during a bar stock bending and stretching operation about a fixed point on the turntable in a direction opposite to the direction in which the turntable rotates.

13. In combination, a forming means, means for rotating the same, holding means adapted to secure a portion of a length of material to move with the forming means, means gripping another portion of the material, means associated with the gripping means for applying a stretch to the material, and a chain operatively connected to the forming means and to the gripping means for moving the gripping means toward the forming means upon rotation thereof.

JAMES S. NIELSEN.
CLYDE B. MITCHELLA.